Patented Nov. 2, 1937

2,097,649

UNITED STATES PATENT OFFICE 2,097,649

METHOD OF AND MATERIAL FOR TREATING BOILER WATER

Thorvald A. Solberg, United States Navy

No Drawing. Application December 31, 1935,
Serial No. 56,999

12 Claims. (Cl. 87—27)

(Granted under the act of March 3, 1883, as
amended April 30, 1928; 370 O. G. 757)

This application is a continuation in part of my co-pending application, Serial No. 697,477, filed November 10, 1933.

This invention relates to the treatment of water used in steam boilers and has for its objects:

A. Elimination or diminution of foaming and carry-over.

B. Elimination or dimunition of priming.

C. Prevention of scale deposits ordinarily encountered on the evaporative surfaces of the boiler.

D. Prevention of the complex scale deposits occurring on the evaporative surfaces, which other boiler water treatments fail to prevent. Among these deposits may be classed the various complex silicates, the complex aluminum silicate compounds, and similar unusual and complex scales not otherwise preventable.

E. Prevention of scale and sludge deposits on the non-evaporative surfaces of the boilers, such as mud drums, headers, downcomers, etc.

F. Rapid elimination of existing scale deposits in all parts of the boiler.

G. Prevention or retardation of corrosion of the boiler metal surfaces (water side of the boiler).

H. The coagulation of certain impurities.

I. The prevention of hard, compact masses of sludge, thereby facilitating its removal from the boiler. This involves making the sludge (insoluble matter in the water) fluid.

J. The prevention of the crystal growth of any salts or chemicals which are deposited on the boiler water surfaces at times when the chemical treatment of the water is deficient. In other words, individual minute crystals may be deposited during such periods, but these crystals are prevented from growing to large masses, and the individual crystals are prevented from uniting to form a compact structure having mechanical strength.

K. The prevention of boiler metal cracking, which is sometimes technically known as "caustic embrittlement" or failure from "corrosion fatigue" or more briefly failure from "fatigue".

L. The prevention of scale or deposits in the boiler feed lines and all appurtenances thereto.

M. The prevention of scale deposits in the steam lines, steam turbines, or other appurtenances thereto.

N. Prevention of the harmful effects of oil contamination of the boiler water.

O. The formulation of compositions for treating boiler water, consisting of three or fewer chemicals consisting always of a starch and either a water soluble carbonate, a water soluble phosphate, or both. These formulas are of such a character that the resulting compositions are suitable for use with any character of water normally used for steam boilers. In other words, the compositions have universal application.

P. Preparation of the compositions for marketing in such a way that no damage will occur to any ingredient during manufacture or subsequent thereto.

Q. Application of the chemicals to the boiler water in a manner and by methods which will not cause damage to any of the various ingredients.

R. The formulation of a composition for treating boiler water, said composition having universal application to all types of boiler waters, and one chemical of said composition being a starch or a starchy carbohydrate.

My invention relates to the application of a starch or a starchy carbohydrate to the treatment of boiler water. (Where "starch" is mentioned hereafter, "starchy carbohydrate" will be considered included.) Corn starch is the preferred material because of its economic availability. The starch is used either alone or in combinations with one or both of two well-known classes of water treating chemicals; namely, the water soluble carbonates and phosphates. These materials are formulated into compositions which have universal application. Heretofore it has not been possible to use successfully any one formula with waters having widely different characteristics. All of the above is novel in the art of boiler water treatment.

I am aware that starch has been utilized heretofore in relatively small quantities in boiler compositions (compounds). The prior use, however, has had the following defects which prevented obtaining any of the effects claimed in this application:

(a) The amounts used have been, in general, too small to give the results claimed in this application.

(b) The amounts used have been haphazard and indefinite, thereby indicating that the inventors failed to appreciate the advantages to be obtained from the use of starch, provided the properly determined amounts were used. This further points to the fact that prior use of starch was incidental or casual.

(c) The composition contained some chemical of the tannin group (extracts of logwood, chestnut or other barks, decayed woods, etc.). Tannin in its various forms reacts with starch, forming a precipitate and thereby preventing any beneficial action by the starch.

(d) The composition was prepared using a concentrated solution of highly caustic substances such as lye and soda. This procedure hydrolizes the starch and causes complex changes in its structure, thereby rendering it useless for boiler water treatment.

(e) In no cases has it been found that starch has been used independently of other chemicals, nor does the prior art teach how it might so be used.

(f) In no cases has it been used by itself for boiler water treatment, nor does the prior art teach how it might so be used.

(g) The prior art fails to indicate that any of the effects obtainable from the use of starch ever were obtained.

(h) The prior art fails to teach any rational or scientific method of applying starch to the treatment of boiler water.

(i) The prior art fails to teach the use of starch with two or fewer other chemicals of the types used in this specification.

Furthermore, the best information obtainable from experts in this art and from the literature indicates that starch, heretofore, has not been utilized as in the present invention. A study of the prior art of boiler water treatment, sometimes known as boiler water conditioning, discloses that the only thought or object has been the elimination or prevention of scale. In the case of many complex scales such as the silicates, no known system of water treatment prevents these scale deposits. None of the other pertinent and important objects required for proper boiler water treatment have been attacked or solved. My present invention solves the elimination of every type of scale in a unique and novel way, and, in addition, attacks and solves all other problems related to the treatment or conditioning of boiler water.

The operation of steam boilers, from their earliest use, has been characterized by various difficulties relating to the water in the boiler. The prior art indicates that the formation of scale on the evaporative surfaces of the boiler was the first recognized, and despite the changes which have taken place in boiler design, this problem is the only one on which any thought or effort has been expended. The technical literature and patent literature are both filled with descriptions and inventions for solving the ordinary scale problems. The prevention of many scales, principally the complex silicate scales, never has been solved satisfactorily. My present invention claims a solution of all scales, including those not heretofore considered preventable. My invention, furthermore, teaches a method of safely removing existing scales more rapidly than any other known method or system.

Of the objects of this invention as listed in items (A) to (R), inclusive, only the problem of scale has been covered in patent literature, so far as can be ascertained. This problem has been attacked by the use of numerous chemicals and a multiplicity of compositions made up from these chemicals. Many of the compositions were designed for use with the low pressure, low capacity boilers of years ago and are valueless in the modern boilers of any pressure. Many others are valueless for any purpose when considered in the present day knowledge of the chemistry of boiler water reactions.

The salts or chemicals which form scale on the evaporative surfaces of a boiler are those whose solubility is slight and whose solubility decreases with increase in temperature. The most important of this group is calcium sulphate. It is treated in the most simple manner in the boiler water by reaction with a highly soluble carbonate or phosphate, as shown in the following formulas:

(1) Sodium carbonate + calcium sulphate = sodium sulphate + calcium carbonate.

(2) Sodium phosphate + calcium sulphate = sodium sulphate + calcium phosphate.

In these examples the sodium carbonate, sodium phosphate, and sodium sulphate all have high solubility. The calcium carbonate and calcium phosphate are of very low solubility, and hence quantities of these are precipitated and are called sludge. Calcium carbonate and calcium phosphate have solubility curves the opposite of the salts of the calcium sulphate type, for their solubility decreases with decrease in temperature (increases with increase in temperature). Hence, these materials tend to deposit or adhere to the colder surfaces of the boiler, such as the steam and mud drums, headers, downcomers, etc.

Proper removal of these substances never has been possible because their natural characteristics are to agglomerate and pack into compact masses and also to adhere to the relatively colder surfaces where no evaporation is taking place. As stated previously, my present invention has for some of its objects the prevention of sludge deposits and a transformation of the sludge into a fluid mass which will not pack and agglomerate and thereby can be removed more easily from the boiler water by the bottom and surface blows or such other means as are provided for this removal (deconcentrators, settling tanks, separators, etc.).

The changes in the properties of boiler water sludges described above are accomplished by the proper and scientific application of starch to the boiler water. The presence of starch in the proper proportions gives any sludge formed a fluid character. This occurs because every particle of the sludge as it is formed becomes enveloped by an infinitesimal film of starch. As starch in solution is slimy and slippery, it is seen that the sludge particles are prevented from joining or agglomerating into a compact mass, and similarly the individual minute crystals or particles as they are formed are prevented from growing into larger crystals or homogeneous structures. It also is evident that the characteristics of the starch which have been imposed on every sludge particle will prevent them from attaching themselves to any of the boiler surfaces.

My description of the behavior of a starch in solution in a boiler will make apparent why it is possible to obtain the many improvements detailed herein. After extensive experimentation, I have found that the results can be obtained only by the proper application of a starch in the proper quantities. The principal characteristic of starch in solution is that the solution is largely colloidal. In other words, there are present in the solution a large proportion of colloidal particles, which state I have determined by the use of a special microscope known as the ultra-microscope. Another characteristic of starch is that it is relatively inert chemically. It is unaffected by alkalis in the dilute solutions existing in boiler water and also generally is unaffected by the other chemicals usually found in boiler water. It follows from this that the colloidal particles will have no chemical reaction with any of the soluble salts or the insoluble matter which may be in the water or may be produced in the water from chemicals used for treating the water. The colloidal particles, on the other hand, do have a distinct and powerful physical action. The principal characteristic of a colloidal solution is that the colloidal particles exhibit what is known as the Brownian movement. Simply stated, this means that the colloidal particles are in motion continuously, but none of these particles collide and join together. I have studied this motion with the ultra-microscope. This colloidal motion insures that any particle or molecule of other substances greater in size than the colloids will be bombarded by or will collide with one or more of the colloidal particles. Subsequently the particle will be enveloped or coated by the starchy substance, after which no more colloids will collide with the particle. The colloidal action will, however, tend to support these particles and keep them in suspension a longer time than they would so remain if the colloids were not present. It must be remembered also that the action of the starch colloids is distinctly different from that of the type of colloids known as "reactive" colloids. This latter type unites chemically with other substances in the water. The action of the starch colloids is purely physical, and for this reason they belong in a class known as "protective" colloids.

My present invention utilizes for boiler water treatment a starch by itself or in combination with a water soluble carbonate or a water soluble phosphate or both. The proper and scientific use of starches is set forth to obtain the objects enumerated in items (A) to (R). A brief discussion of each object follows, with the methods by which this invention attains the desired object. Differences between this invention and the prior art also are detailed.

A.—Elimination of foaming and carry-over

Foaming is caused by the presence in the water of objectionable quantities of soluble matter or insoluble matter or both. There then exists a layer of foam on top of the water, through which the steam bubbles must force their way. Consequently, varying quantities of the foaming water may be carried over with the steam, thereby preventing the production of a dry steam. Wet steam is, of course, undesirable. The presence of starch changes the boiling characteristic of the water and at the same time prevents the permanence of the bubbles of foam, thereby reducing the thickness of the foam or eliminating it entirely. The foam is caused first by uneven boiling and, secondly, by the presence of materials or chemicals which give the thin envelope of liquid surrounding the bubbles enough strength to prevent the rapid breaking of the steam bubbles as they emerge from the surface of the water. Carry-over is sometimes caused by the permanence or strength given to the steam bubbles by the enveloping structure of liquid and small insoluble particles. The insoluble particles form a miniature framework for each bubble, thereby giving it such strength that the bubble persists on being released from the water surface and may be carried out of the boiler with the steam. The presence of a starch in proper proportions insures that all the insoluble particles are coated or enveloped by the starchy substance which reduces the cohesion between adjacent particles or liquid films and hence reduces the structural strength of the steam bubble envelope. Consequently, the bubbles will burst either when released or shortly thereafter. This reduces or eliminates the possibility of any bubbles being carried out of the boiler, and consequently the production of wet steam is eliminated or at least greatly reduced. In extreme cases of carry-over (wet steam) it has been possible to reduce the moisture in the steam to no more than $\frac{1}{6}$th of that occurring without the use of starch.

B.—Elimination of priming

Priming is the projection or throwing of large quantities of water into the steam line leaving the boiler. This effect is produced by irregular, uneven, or violent boiling in various areas of the boiler water. It might be likened to the effect which would be produced by small explosions taking place in the boiler water. It is similar to the phenomenon of "bumping" which is often observed in the chemical laboratory when solutions are boiled. The presence of starch promotes smooth, even boiling, because the starch, through its colloidal activity, keeps the various chemical substances (soluble or insoluble) evenly distributed throughout the water and promotes the rapid release of small bubbles from the evaporative surfaces as soon as evaporation occurs. The presence of the starch also prevents the joining of several small bubbles to form a large bubble which on release from the water surface might break or disrupt violently so as to eject quantities of water from the boiler into the steam. This effect has a bearing on all types of carry-over of water from a boiler.

C.—Prevention of scale deposits ordinarily encountered on the evaporative surfaces of the boiler This is accomplished in the present invention by the use of a water soluble carbonate or a water soluble phosphate or both, but always in conjunction with the use of a starch. The prior art teaches ordinary scale prevention with the carbonates and phosphates, but the present method is new and novel in the proper addition of starch and the effects obtained by these, all of which have not been obtained heretofore. The proper proportion of starch insures the following actions which heretofore have not been obtained.

(1) More rapid reaction between the scale producing chemical and the treating chemical. The starch, by its colloidal action, insures rapid and even dissemination of all chemicals throughout the water, thereby bringing the reactive chemicals together at the earliest moment. This prevents scale deposits caused by poor distribution of chemicals in the water.

(2) The starch colloids keep the insoluble matter formed by the above chemical reactions in suspension a relatively long time. Rapid settling is prevented thereby. This and the colloidal activity in the water at the evaporative surfaces prevent the possibility of any sludge particles from settling on or adhering to the evaporative surfaces.

(3) During periods when not enough treating chemicals are present to prevent the formation of scale, scale will occur on the evaporative surfaces, when prior art is being followed for water treatment. In the present invention the presence of starch is utilized to prevent such scale formation. The starch colloids present at the evaporative surfaces will coat both the metal surfaces and the scale-forming particles as they are produced by the process of evaporation and thereby prevent their deposit as adherent scale and furthermore, will prevent the growth of any crystals formed; consequently, any deposits formed will have no mechanical strength. They will fail to build up into thick, destructive layers because the low mechanical strength and the fluidity of the particles will enable the water currents and the colloid bombardments constantly to slough off and remove these particles. The colloidal forces, or the forces exerted by the motion of the colloidal starch particles at the evaporative surfaces also will resist the deposit of each minute crystal of scale as it is formed.

(4) The presence of a film of starch on the metal of the boiler also will act to prevent the attachment of any scale particles. Consequently, during periods when not enough treating chemical is present and scale normally would be expected to deposit, the presence of starch will operate to prevent such deposits.

D.—Prevention of complex scale deposits on the evaporative surfaces

There are in operation today many boilers in which harmful complex scale deposits occur despite the efforts of those highly skilled in the art of boiler water treatment to prevent these deposits. The use of elaborate external water softening apparatus and, in addition, the employment of various chemicals in the boiler itself has failed to prevent these deposits. Generally these deposits are made up of complex aluminum and silicon salts. They have the lowest coefficients of heat transfer of all scales and, consequently, cause burning out of tubes after a comparatively thin scale has formed. I have found that the use of starch as prescribed in the present invention will prevent such deposits through the following actions:

(1) Because of the action of the starch colloidal particles at the evaporative surfaces which tend immediately to coat every solid particle or crystal formed by evaporation and concentration of the boiler water at the point of evaporation, this coating prevents adherence of the particle to the boiler metal.

(2) I have found that the action of the starch colloidal particles is to bombard every solid particle in the water and thereby tends to keep it in suspension and further to prevent its settling on any surface until it reaches a region where the forces produced by the circulation and the convection of the water are sufficiently low to allow the forces of gravity to draw these coated particles to the lowest point in the boiler, generally the mud drums, the bottom of the headers, or other low portions of the boiler.

(3) The coagulation of the impurities in the boiler by the colloidal action of the starch. The existence of this excellent coagulation reduces the concentration of these undesirable scale-forming salts by the forces of attraction exerted by this state of coagulation and further by the washing or scrubbing effect of the coagulated particles which are constantly in motion and probably absorb or adsorb siliceous matter, thereby tending to reduce these concentrations and hence prevent deposits of these complex substances.

(4) In case conditions are such that deposits are formed, these deposits will no longer be the hard, glassy, dense, mechanically strong scale previously described. Instead, they will be loose, flaky, amorphous deposits of low mechanical strength which will not grow or increase to a thickness which will cause tube failures. These deposits will be easily removable and, in most cases, will be removed by the washing effect of circulating currents of water and by the physical forces created by the starchy colloids as previously described.

E.—Prevention of scale and sludge deposits on the non-evaporative surfaces

It previously was stated that sludge deposits consist generally of calcium carbonate and phosphate and that these chemicals of low solubility have characteristics such that the solubility decreases with decrease in temperature. For this reason these chemicals generally will be found deposited to greater or less extent on the relatively cool surfaces of the boiler, such as the steam and mud drums, headers, downcomers, and tube ends, where no evaporation takes place. These deposits are objectionable principally because they prevent examination of the surfaces so covered, and when occurring in the ends of tubes must be removed by cleaning. The present invention prevents such deposits by the proper use of starch. The method consists of providing in the boiler water sufficient starch to insure that each sludge particle is coated with a starch film. This not only prevents packing and agglomeration of the sludge, but renders the sludge masses fluid, so that they flow or move easily and therefore are removed more efficiently by the bottom blow or other means provided. It can be determined whether a sufficient quantity of starch is present by either of two methods as follows: by visual observation of the character of the coagulation existing in a sample of water withdrawn from the bottom blow; and, second by allowing a quantity of sludge obtained from the bottom blow or by other means to dry on a metal plate and observing whether the sludge cracks up into small sections which can be removed from the plate with no adhering particles remaining on the plate.

A search of the technical literature and prior patents fails to disclose any evidence that this important factor of proper boiler operation and boiler water treatment has been accomplished by any known method.

F.—Rapid elimination of existing scale

It is well known that chemicals used for preventing scale deposits also gradually will remove scale already formed. The process, however, is slow, because the scale becomes covered with the products resulting from the reaction between the treating chemicals and the constituents. This slows up or prevents further attack until these reaction products are in some way removed. The presence of starch in sufficient quantity results in removal of these products as rapidly as they are formed, thereby presenting fresh scale surface for further attack by the treating chemicals. This removal action is the result of colloidal activity previously described and good coagulation

G.—The prevention or retardation of corroion of the boiler metal surface (water side)

The starch by actual test in boilers over a period exceeding a year has demonstrated that boiler corrosion is reduced materially when starch in the quantities specified by me is used. This can be explained in two ways: first, the character of the corrosion appears to be changed from the oxide type to the less destructive type; second, the effect of the colloidal activity and excellent coagulation in all parts of the boiler acts to dislodge and remove any oxygen bubbles which may become attached to the boiler metal incident to its separation from the water on heating and evaporation in the boiler. These bubbles may be infinitesimal in size, but their cumulative effect over a relatively short period may be great and result in a boiler casualty.

H.—The coagulation of certain impurities

A boiler water under operating conditions usually contains a multiplicity of insolubles in suspension. This may be foreign solid matter entering the boiler with the feed or solid particles formed by the chemicals used for treating the water. The colloidal action of the starch previously explained serves to coagulate such matter into relatively large masses, and these subsequently by the preponderant force of gravity gradually settle to the lower parts of the boiler, where they are harmless and then may be removed more easily, if desired, by the use of the bottom blow or such other means as are provided. As suspended solids are objectionable in the water, as heretofore shown, it can be seen that any method of treatment which facilitates their removal is of distinct advantage. The character of the coagulation existing in any boiler water can be determined by visual examination of a freshly drawn sample of boiler water as previously explained.

I.—The prevention of hard, compact masses of sludge and thereby facilitating its removal from the boiler It already has been described how every solid particle in the boiler water becomes coated with a starch film when starch is present in sufficient quantity. This prevents the various particles from becoming attached and bonded to each other in any way. Consequently, the sludge particles, instead of forming hard, compact masses, agglomerate as a fluid body of high viscosity. This characteristic makes removal from the boiler easy by means of the bottom blow or other means provided.

J.—The prevention of crystal growth

It is well known that when salts or chemicals are deposited out of solution they form compact crystal structures having a definite mechanical strength varying with the chemical being deposited. The presence of a film of starch on every surface in the boiler and on the surface of every new solid formed in the boiler prevents growth of any crystal structures. Chemicals deposited out on any surface, therefore, will consist of a multiplicity of separate minute crystals instead of relatively few large crystals. As the small crystals are not bonded together, the structure has practically no mechanical strength. A similar effect is observed in the case of metals having a large amount of inclusions—the strength of the metal is always comparatively low.

K.—The prevention of boiler metal cracking

Boiler metal cracking is sometimes known as "caustic embrittlement" or "corrosion fatigue". Briefly, it is the occurrence of numerous cracks generally in areas where high metal stresses are known to exist, such as in riveted seams and the rivets themselves. The cause generally is ascribed to the existence of high metal stresses of varying cyclic intensity and an attack on the metal by caustic or alkali present in the boiler. There is as yet no acknowledged perfect explanation of the causes of this phenomenon. Up to the present time the best means of preventing such failures has consisted of maintaining in the boiler water definite ratios of soluble sulphates to alkalinities, the ratios varying with the pressure in the boiler. The theory is that an infinitesimal film of sulphate is maintained on the metal surfaces, which prevents attack by the caustic or alkaline matter in the water.

The present method consists of providing sufficient starch to insure that there is at all times present in the boiler metal surfaces a definite film of starch which will protect said surface from attack by any alkaline matter. The failure of any substances to cling to the metal in a boiler so treated is evidence that such a film exists. Physical examination also verifies this fact.

L.—The prevention of scale deposits in the feed lines and all appurtenances thereto The only method used to prevent this is that of preventing or delaying any chemical reaction which might occur in this part of the system. The use of starch in the feed system obviates such difficulties by an entirely different process. Any particles formed are coated with the starch and consequently are rendered non-adherent. They therefore will be carried along with the water to the boiler. The importance of this protection can be realized when it is remembered that there have been many instances where feed water heaters and feed lines have become so clogged with deposits that they have become inoperative until cleaning was effected.

M.—The prevention of deposits in the steam turbines, steam lines, and appurtenances thereto It has been explained previously how every solid particle in a boiler water treated with a starch or a starchy carbohydrate becomes coated with a film of starch and thereby is made non-adherent to any surfaces. Consequently, if any solid particles are carried over with the steam from the boiler, they will not form objectionable deposits in the turbines and steam lines. The importance of this feature can be realized when it is considered that many turbines suffer a gradually increasing loss in operating efficiency from the building up of deposits on the turbine blades. Eventually it becomes necessary to dismantle the turbine to remove the deposits or, in some cases, to effect a washing and dissolution of the scale by other means. The expense of labor and outage is considerable. The protection afforded by this invention has never been obtained by any other means.

N.—Prevention of the harmful effects of oil contamination of boiler water

The effect of any oil on boiler water is generally serious. Not only does the oil cause priming, foaming, and carry-over of water with the steam, but the evaporative surfaces may become coated with a film of oil which greatly decreases the rate of transfer of heat to the boiler water and frequently results in burning and rupture of the tubes in water tube boilers or sagging of combustion chambers in fire tube boilers. My invention utilizes the action of a starch in the boiler water to prevent any of the above dangerous conditions. The starch breaks up the oil and envelops each particle and thereby removes it, through the combined forces of coagulation and gravity, to zones where it easily is removed by any of the various means provided. Once the oil particles are enveloped by a starch film, they behave the same as other suspended particles, as previously described. There is no record of any method by which the harmful effects of oil contamination of a boiler water heretofore have been prevented.

O.—*The formulation of a composition for treating boiler water, consisting of three or fewer chemicals, consisting always of a starch and either a water soluble carbonate or a water soluble phosphate or both*

It is acknowledged that the water soluble carbonates and phosphates are the best suited for treating boiler water for the prevention of ordinary scales. The use of a starch with either or both of these chemicals serves the many objects heretofore and hereafter described. There is no record of any prior use of a starch or a starchy carbohydrate with these chemicals. The amounts of starch or starchy carbohydrate can be determined by the methods devised and discovered by me and heretofore were unknown by those skilled in the art and others.

P and Q.—*Preparation of compositions containing starch for marketing in such a way that no damage will occur to the starch during manufacture or subsequent thereto, including application to the boiler water*

I prefer to market compositions containing starch in the dry state, so that no concentrated solutions tending to destroy the starch will be possible. It is equally important that in mixing the composition for application to the boiler, concentrated solutions be avoided. It follows that if marketed in a wet condition the concentration of the chemicals must not exceed that value above which the properties of the starch will be affected adversely. Prior use of starch has been such that excessive alkaline concentrations have destroyed any beneficial property of the starch which might have been obtained. When the starch is applied independently of the other chemicals, it should be dissolved (gelatinized) in hot water either neutral or slightly alkaline.

R.—*The formulation of a boiler composition for treating boiler water, said composition having universal application to all types of boiler water and one constituent of the composition being a starch or a starchy carbohydrate*

The action of starch when used with a water soluble carbonate and one or more other water treating (softening) chemicals is partially to prevent or retard the usual hydrolysis of the carbonate under boiler conditions. This makes it possible to formulate compositions which can be used with all types of waters. Such compositions will be shown later.

In my presentation of the objects of boiler water treatment, I have shown that these objects are all obtained in a new and novel manner involving the use of a starch or a starchy carbohydrate with or without other chemicals. I have also shown from the matter set forth above that the only object which the prior art has attempted to solve is that of scale prevention on the evaporative surfaces. My invention attains this object also, but in a new and novel manner which is a distinct improvement in the prior art of scale prevention. My invention also solves the problems of preventing deposits of those difficult complex scales which heretofore have not been prevented by any known method.

The proper and scientific determination of the amount of starch to be used either by itself or in conjunction with other chemicals is of extreme importance if the objects previously enumerated are to be obtained. I have devised various methods of arriving at these determinations.

First of all, the amount of starch can be proportioned to the amount of scale-forming salts entering the boiler. As the principal salts of this class are those of calcium it is possible to base the amount of starch on the total weight of calcium in all the calcium salts entering the boiler. For every pound of calcium entering the boiler there should be introduced seven (7) ounces of starch. This amount in general will take care of any magnesium scale-forming salts present also as the prevalence of these compared to the calcium salts is slight. Methods of determining whether or not sufficient starch is being used will be explained later. It is to be understood that the proportion of calcium to starch may vary from the above rule but generally better results will be obtained if the proportion does not go outside the limits of twenty-five to one and one-half to one.

Second, the usual methods of determining the amount of chemicals to be used for preventing the deposit of any scale is by the use of simple chemical formulas such as (1) $Na_2CO_3 + CaSO_4 = Na_2SO_4 + CaCO_3$ (2) $2Na_3PO_4 + 3CaSO_4 = 3Na_2SO_4 + Ca_3(PO_4)_2$ Knowing the analysis of any water, it is then possible to determine the amount of carbonate or phosphate required to combat the calcium salts present. Inasmuch as the amount of starch required is also a function of the scale-forming salts, I have determined formulas by which the amount of starch can be computed directly from the amount of chemical being used for scale prevention (including also scale removal). The following approximate formulas were determined by actual test in experimental boilers and are as follows but are subject to modification as found necessary or desirable with different water conditions:

(1) $\dfrac{P_2O_5 \text{ weight value of phosphate used}}{\text{weight of starch}} = 2.25$ (2) $\dfrac{PO_4 \text{ weight value of phosphate used}}{\text{weight of starch}} = 3.01$ (3) $\dfrac{CO_3 \text{ weight value of carbonate used}}{\text{weight of starch}} = 2.85$ It is to be understood that the values given for the above three ratios may vary from one to ten, but, in general, values at or near those specified will be more satisfactory. The $P_2O_5$ value of any phosphate is the usual commercial method of expressing the reactive value of any phosphate. For instance, the $P_2O_5$ value of trisodium phosphate ($Na_3PO_4.12H_2O$) is 18.7 per cent which means that in every pound of the chemical there is available 0.187 pound of $P_2O_5$. Similarly each pound would have 0.251 pound of the phosphate radical $PO_4$. Monosodium phosphate ($NaH_2PO_4.H_2O$) has a $P_2O_5$ of 51.4 per cent and $PO_4$ value of 68.9 per cent. If desired, the amount of starch to be used per pound of any one of the numerous water soluble phosphates can be determined by use of Formulas 1 and 2 above. The use of the formula for carbonate (No. 3) will be apparent from the above explanation of Formulas 1 and 2.

Third, when silica is present in quantity such that a silica scale is being deposited, I have found that an additional formula is necessary to determine the amount of starch required to prevent these deposits. It has been found by test that if one-half part of starch (by weight) is fed to the boiler for each part by weight of silica that such scales will be prevented. The proportion stated above, however, may vary from values of 1/20th to 10. In most cases the starch fed as determined by either of Formulas 1, 2, or 3 above also will provide the starch necessary to prevent ordinary silica scale deposits. Where silica is the predominant factor, however, as in the case of a soft or a previously softened water, it is desirable to use the starch to silica proportion approximately as described above.

Fourth, I have found that if desired, the amount of starch can be determined from a consideration of the sludge or solid matter precipitated in the boiler. Enough starch must be added to the boiler water so that for each pound of sludge formed there will be from 1/20th to one pound of starch fed to the boiler and preferably ⅛th of a pound.

Fifth, as a result of my experiments I have found that the results described herein can be obtained by the addition of other materials which are a source of colloids of the protective type when dissolved in boiler water.

I have found it desirable in addition to the use of formulas and calculations for determining the proper amount of starch to use, also to have tests which will indicate positively whether or not the desired results are being obtained. The following methods have been devised by me as a result of actual test and experimental work.

(1) Obtain a quantity of sludge from the bottom below. This can be done best as follows: Collect a gallon of water (more if necessary) from the bottom blow and allow it to stand until the sludge has settled. Then decant the water and spread about a quarter inch layer of the sludge on a flat piece of metal, allow the sludge to dry naturally, or by using a moderate heating if it is desired to hasten matters. If the requisite amount of starch is present in the boiler, it will be found that the sludge cracks up into small pieces about one-half to one inch on a side, the pattern much resembling a jig-saw puzzle design. It also will be found that the pieces of sludge can be lifted from the plate easily and that none of the sludge will remain on the plate.

(2) Withdraw a sample of water from the bottom blow of the boiler into a small beaker. Observe immediately the character of the coagulation existing in the water. If sufficient starch is present, it will be noted that the suspended matter will remain in violent motion or in an agitated state for a considerable period after drawing the water. In boiler water not treated with starch the suspended solids (insoluble matter) do not display this activity and settle rapidly to the bottom.

(3) Allow the sample taken in (2) above to stand until the solid matter has settled. When the supernatant liquid is clear and free of solids, gently tilt the beaker through ninety degrees (putting it at right angles to its former position). The sludge or solid matter on the bottom will be found to flow down easily and quickly and none will adhere to the bottom of the beaker if sufficient starch is present in the boiler water. It will be found also that the sludge will display this fluidity and non-adherence even though the beaker has been allowed to stand for twenty-four hours.

(4) The determination of the amount of starch necessary to prevent priming, foaming and carry-over is dependent largely on the design of the boiler. If starch is applied as specified in Formulas 1, 2, or 3 above, the starch so applied usually will be sufficient for preventing any type of carry-over. If starch is to be used only for preventing foaming, priming and carry-over, it should be added gradually until it is found that the desired effect is obtained. I have found that maintaining a concentration of ¼ to ½ pound of starch for each 1,000 gallons of water in the boiler gives the best results.

Care is necessary in the use of starch in order to prevent any deterioration or destructive change in the starch which adversely affects its properties for use in boiler water treatments. If excessive alkalinity is obtained in manufacturing a composition containing starch, or when preparing it for introduction into the boiler, the starch loses its value for boiler water treatment and no beneficial effects can be obtained from its use. Under conditions of high alkalinity starch changes largely to dextrose.

Heretofore there has been no known method for determining the amount of starch present in boiler water in any chemical literature or chemical textbook. This is because no one has used starch in such a way as to obtain any of the effects herein enumerated and, consequently, there was no demand for such a test. I have devised a method for determining the amount of starch present in a boiler water which briefly is as follows: Take a one liter (1,000 c. c.) and concentrate it to 20 c. c. (cubic centimeters) and boil for four hours with 5 c. c. of concentrated hydrochloric acid. Neutralize this with sodium carbonate and then add distilled water to bring volume to exactly 30 c. c. This process converts all the starch to dextrose and concentrates it 1,000/30 or 33.3 times. Then to 3.0 c. c. of this solution add 1.5 c. c. of 5 per cent solution of potassium hydroxide (KOH) and 3.0 c. c. of 0.6 per cent picric acid solution and dilute to 10 c. c.

Prepare a standard solution of dextrose by dissolving 1.0 gram of chemically pure dextrose in 1,000 c. c. of water. As this solution contains 1 gram per liter or 1,000 milligrams per liter, it may be expressed also as having a concentration of dextrose of 1,000 parts per million. Using separate test tubes, take 0.9 c. c., 1.2 c. c., 1.5 c. c., and 1.8 c. c. of this standard solution and to each add 1.5 c. c. of 5 per cent potassium hydroxide and 3.0 c. c. of 0.6 per cent of picric acid solutions. Place these samples in boiling water for 12 to 15 minutes during which a mahogany red color will develop, the intensity of the color varying because of the differences in the dextrose concentrations. Dilute these comparator samples to 10 c. c. by adding water. The unknown sample of 30 c. c. previously prepared is placed in boiling water for 12 to 15 minutes so as to develop its color. This unknown sample is then compared with the above standards. Suppose the unknown sample matches the color of the test tube containing the 1.5 c. c. of standard dextrose solution. Since the standard from which these were made up contained 1,000 milligrams per 1,000 c. c. each c. c. had 1 milligram and, consequently, the 1.5 c. c. sample had 1.5 milligrams of dextrose. As the 1.5 c. c. was diluted to 10 c. c., this amount then had 1.5 m. g. (milligrams) of dextrose and, therefore, this corresponds to a concentration of 1,000/10×1.5 or 150 milligrams per 1,000 c. c. of solution or in other words, a concentration of dextrose 150 parts per million. As the unknown sample first was concentrated 33.3 times (1,000/30) and then was diluted 3.33 times from 3.0 c. c. to 10 c. c., it finally represented a tenfold concentration of the original water. Consequently, the original water contained 150/10 or 15 parts per million of dextrose. As 1 part of starch when hydrolyzed produces .9 part of dextrose, the sample tested must have 15/.9 or 16.6 parts of starch per million. If desired, the standard solution can be made up from starch as a base remembering that 1.0 gram of starch hydrolyzes to 0.9 gram of dextrose. The necessary variation to the computations is evident.

Heretofore, the only known test for starch has been the well known iodine test which is only qualitative and is ineffective under boiler water conditions.

Two formulas will be given to illustrate compositions containing starch which will obtain the objects described in this invention. These compositions will be suitable for use with a large variety of waters. This valuable characteristic is brought about by the beneficial action of the starch as previously explained. It will be understood by those skilled in the art that for certain special and unusual conditions it may be desirable to vary the proportions given in order to obtain greater economy. It will be understood also by those skilled in the art that water soluble phosphates other than those shown can be used by changing the amount of starch to accord with the $P_2O_5$ value or $PO_4$ value of the phosphate used. In the case of a water treatment using a carbonate as a base, the amount of starch will be computed as shown in this specification.

It is to be understood further that, if desired, the chemicals involved may be introduced into the boiler separately instead of first being mixed together.

The two compositions found to be very satisfactory are shown below. It should be noted that the two compositions have practically the same chemical balance. The use of the disodium phosphate (anhydrous) in one composition requires that some of the sodium carbonate be used to change it into the trisodium phosphate in the boiler. The composition having the disodium phosphate will be found to be about one-third more effective, pound for pound, for treating a boiler water. Economic considerations will determine which formula to use.

|  | Per cent |
|---|---|
| Sodium carbonate | 44 |
| Anhydrous disodium phosphate | 47 |
| Starch | 9 | and

|  | Per cent |
|---|---|
| Sodium carbonate | 20 |
| Trisodium phosphate | 75 |
| Starch | 5 |

I have shown that the presence of a starch or a starchy carbohydrate in the boiler water results in the attainment of all the known objects of boiler water treatment. I can substantiate the statements herein by reports of actual tests.

The invention described herein may be manufactured and used by or for the Government of the United States of America for governmental purposes, without the payment of any royalties thereon or therefor.

I claim:

1. A method of treating boiler water which comprises maintaining in said water, by the addition of starch alone, a starch in a proportion substantially not less than seven ounces of starch for each pound of calcium in said water.

2. A method of treating boiler water which comprises maintaining in said water, by the addition of starch alone, a starch in a proportion substantially not less than one-half pound of starch for each pound of magnesium in said water.

3. A method of treating boiler water which comprises maintaining in said water, by the addition of starch alone, a starch in a proportion substantially not less than one-half pound of starch for each pound of silica in said water.

4. A method of treating boiler water comprising the addition of starch thereto in a fixed proportion to the amount of water soluble phosphate added to the said water, such proportion being not substantially less than the ratio expressed by the formula, $$\frac{\text{Phosphate radical } P_2O_5 \text{ by weight}}{\text{starch by weight}} = 2.25.$$

5. A method of treating boiler water comprising the addition of starch thereto in a fixed proportion to the amount of water soluble phosphate added to the said water, such proportion being not substantially less than the ratio expressed by the formula, $$\frac{\text{Phosphate radical } PO_4 \text{ by weight}}{\text{starch by weight}} = 3.01.$$

6. A method of treating boiler water comprising the addition of starch thereto in a fixed proportion to the amount of water soluble carbonate added to said water, such proportion being not substantially less than the ratio expressed by the formula, $$\frac{\text{Carbonate radical } CO_3 \text{ by weight}}{\text{starch by weight}} = 2.85.$$

7. A composition for treating boiler water comprising the following ingredients substantially in the percentages specified, by weight:

|  | Per cent |
|---|---|
| Soda ash | 44 |
| Anhydrous disodium phosphate | 47 |
| Starch | 9 |

8. A composition for treating boiler water comprising the following ingredients substantially in the proportions specified, by weight: Water soluble alkaline carbonate and water soluble alkaline phosphate in substantially equal proportions and a starch in quantity equal to about 20 per cent of either of the other ingredients.

9. A method of treating boiler water to prevent caustic embrittlement which comprises maintaining in said water, by the addition of starch alone, a concentration of starch in a proportion not less than one-half pound of starch per 1,000 gallons of water.

10. A method of treating boiler water to prevent foaming and priming which comprises maintaining in said water, by the addition of starch alone, a concentration of starch not substantially less than one-eighth pound of starch per 1,000 gallons of water.

11. A composition for treating boiler water consisting of substantially 75 per cent trisodium phosphate, 20 per cent soda ash, and 5 per cent starch.

12. A composition for treating boiler water, having as principal active ingredients a water soluble phosphate and a starch wherein the ratio, by weight, of the phosphate, computed as phosphate radical, to the starch is not substantially less than 2.25.

THORVALD A. SOLBERG.